United States Patent
Yoshioka et al.

(10) Patent No.: US 10,099,677 B2
(45) Date of Patent: Oct. 16, 2018

(54) VEHICLE CONTROL METHOD AND VEHICLE CONTROL DEVICE

(71) Applicant: Nissan Motor Co., Ltd., Yokohama-shi, Kanagawa (JP)

(72) Inventors: Youko Yoshioka, Kanagawa (JP); Yuuki Ozawa, Kanagawa (JP); Takao Andou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/572,598

(22) PCT Filed: Jun. 15, 2015

(86) PCT No.: PCT/JP2015/067129
§ 371 (c)(1),
(2) Date: Nov. 8, 2017

(87) PCT Pub. No.: WO2016/203508
PCT Pub. Date: Dec. 22, 2016

(65) Prior Publication Data
US 2018/0141535 A1  May 24, 2018

(51) Int. Cl.
*B60W 10/00* (2006.01)
*B60W 20/00* (2016.01)
(Continued)

(52) U.S. Cl.
CPC .............. *B60W 20/00* (2013.01); *B60K 6/48* (2013.01); *B60K 6/543* (2013.01); *B60L 9/18* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,506,449 B2 * | 8/2013 | Yoshida | B60K 6/48 477/180 |
| 8,972,135 B2 * | 3/2015 | Akebono | B60W 50/0205 701/67 |
| 8,983,703 B2 * | 3/2015 | Akebono | B60K 6/48 701/22 |
| 9,115,682 B2 * | 8/2015 | Gibson | F02N 11/00 |
| 9,187,076 B2 * | 11/2015 | Nedorezov | F02D 41/065 |
| 9,296,387 B2 * | 3/2016 | Doering | B60W 10/196 |
| 9,327,707 B2 * | 5/2016 | Hawkins | B60W 10/06 |
| 9,327,728 B2 * | 5/2016 | Gibson | B60K 6/48 |
| 9,333,972 B2 * | 5/2016 | Neumann | B60W 30/18072 |
| 9,381,909 B2 * | 7/2016 | Banker | B60W 10/184 |
| 9,586,469 B2 * | 3/2017 | Orita | B60K 6/48 |

(Continued)

FOREIGN PATENT DOCUMENTS

DE  10 2006 005 468 A1  8/2007
JP  2003-118432 A  4/2003
(Continued)

*Primary Examiner* — Redhwan K Mawari
(74) *Attorney, Agent, or Firm* — Global IP Counselors, LLP

(57) ABSTRACT

A vehicle control device is provided with a friction clutch for engaging and disengaging a motor/generator and a drive wheel, a mechanical oil pump driven by the motor/generator to supply hydraulic oil pressure to the friction clutch, an electric oil pump driven by an electric motor to supply hydraulic oil pressure to the friction clutch, and a control unit. The control unit stops a motor/generator when a vehicle stops; maintains a release of a friction clutch when slack in the stroke is eliminated by the hydraulic oil pressure from the electric oil pump; raises a rotational speed of the motor/generator toward a target rotational speed upon a request to cancel stoppage of the motor/generator; and restricts the torque to be less than the motor generator torque at which the target rotational rate can be maintained when the rotational rate of the motor/generator is raised toward the target rotational rate.

5 Claims, 4 Drawing Sheets

(51) Int. Cl.
*B60K 6/48* (2007.10)
*B60K 6/543* (2007.10)
*B60L 9/18* (2006.01)
*B60W 10/02* (2006.01)
*B60W 10/08* (2006.01)
*B60L 15/20* (2006.01)
*B60W 10/30* (2006.01)
*B60W 30/18* (2012.01)
*B60W 30/20* (2006.01)
*F16D 48/06* (2006.01)
*B60W 20/40* (2016.01)

(52) U.S. Cl.
CPC ......... *B60L 15/2054* (2013.01); *B60W 10/02* (2013.01); *B60W 10/08* (2013.01); *B60W 10/30* (2013.01); *B60W 20/40* (2013.01); *B60W 30/18027* (2013.01); *B60W 30/20* (2013.01); *F16D 48/06* (2013.01); *B60W 2510/0241* (2013.01); *B60W 2520/04* (2013.01); *B60W 2540/103* (2013.01); *B60W 2710/021* (2013.01); *B60W 2710/025* (2013.01); *B60W 2710/081* (2013.01); *B60W 2710/083* (2013.01); *B60W 2710/085* (2013.01); *B60Y 2200/92* (2013.01); *Y10S 903/93* (2013.01); *Y10S 903/946* (2013.01)

(56) References Cited

U.S. PATENT DOCUMENTS

| | | | | |
|---|---|---|---|---|
| 9,650,047 | B2 * | 5/2017 | Shelton | B60W 30/18072 |
| 9,791,040 | B2 * | 10/2017 | Nedorezov | F16H 61/0251 |
| 2007/0207892 | A1 | 9/2007 | Dreibholz et al. | |
| 2013/0296119 | A1 * | 11/2013 | Reed | B60W 10/02 |
| | | | | 477/5 |
| 2014/0288754 | A1 | 9/2014 | Kasuya et al. | |

FOREIGN PATENT DOCUMENTS

| | | |
|---|---|---|
| JP | 2007-320550 A | 12/2007 |
| JP | 2009-262749 A | 11/2009 |
| JP | 2010-179860 A | 8/2010 |
| JP | 2012-76510 A | 4/2012 |
| JP | 2012-86717 A | 5/2012 |
| JP | 2012-97843 A | 5/2012 |
| JP | 2012-163117 A | 8/2012 |
| JP | 2013-35441 A | 2/2013 |
| JP | 2013-132166 A | 7/2013 |
| JP | 2013-189136 A | 9/2013 |
| RU | 147625 U1 | 11/2014 |
| WO | 2013/104866 A2 | 7/2013 |

* cited by examiner

VEHICLE CONTROL METHOD AND VEHICLE CONTROL DEVICE

CROSS-REFERENCE TO RELATED APPLICATIONS

This application is a U.S. National stage application of International Application No. PCT/JP2015/067129, filed Jun. 15, 2015.

BACKGROUND

Field of the Invention

The present invention relates to a vehicle control method and a vehicle control device.

Background Information

Japanese Laid-Open Patent Application No. 2013-189136 (Patent Document 1) discloses a technique to maintain the rotational speed of a motor/generator at a predetermined rotational speed when a vehicle is stopped, in a vehicle comprising a friction clutch that connects/disconnects the torque transmission between the motor/generator and the drive wheels.

SUMMARY

However, in the conventional technology described above, since the motor/generator is driven even when the vehicle is stopped, there is room for improvement of the fuel efficiency. An object of the present invention is to provide a vehicle control method and a vehicle control device that can improve the fuel efficiency of a motor/generator.

In the present invention, the motor/generator is stopped when the vehicle is stopped, and the friction clutch is kept released by the hydraulic pressure from an electric oil pump in a state in which the slack in a stroke is eliminated, and upon receiving a stoppage cancellation request for the motor/generator, the rotational speed of the motor/generator is increased toward a target rotational speed, and when increasing the rotational speed of the motor/generator toward the target rotational speed, a torque of the motor/generator is limited to a less than the torque of the motor/generator at which it is possible to maintain the target rotational speed.

Therefore, in the present invention, it is possible to improve the fuel efficiency of the motor/generator.

BRIEF DESCRIPTION OF THE DRAWINGS

Referring now to the drawings, a vehicle control device is illustrated.

DETAILED DESCRIPTION OF THE EMBODIMENTS

Figure 1:
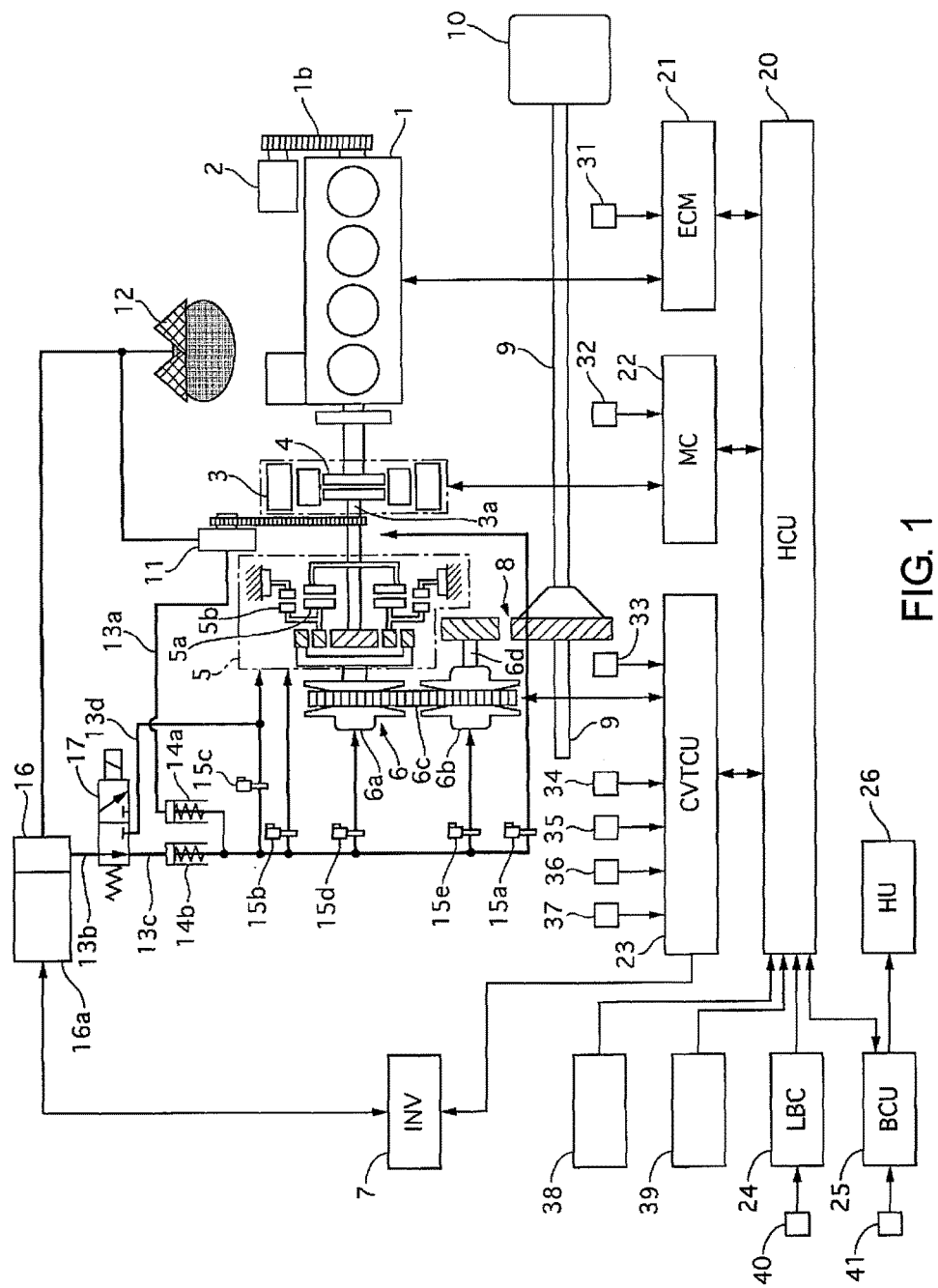
FIG. 1 is a configuration diagram of a powertrain of an FF hybrid vehicle in a first embodiment.

A preferred embodiment of a vehicle control device is explained below based on embodiments illustrated in the drawings.

First Embodiment

FIG. 1 is a configuration view of a powertrain of an FF hybrid vehicle of the first embodiment. The engine 1 is a transverse engine that is disposed in a front compartment, such that the rotational axis direction of the crankshaft 1*a* is oriented in the vehicle width direction. The starter motor 2 meshes with an engine starting gear 1*b* provided relative to the crankshaft 1*a*. The starter motor 2 uses a 12V battery, which is not show, as the power source. The 12V battery is charged by the starter motor 2 functioning as a generator during an operation of the engine 1. In addition, the 12V battery is charged with electrical power from a lithium-ion battery, which is not shown, via a DC/DC converter (not shown).

One of the motor output shafts 3*a* of the motor/generator 3 is connected to the engine 1 via a first clutch 4, and the other is connected to the belt type continuously variable transmission (CVT) 6 via a second clutch 5. The motor/generator 3 is a three-phase alternating current permanent magnet type synchronous motor, and uses a lithium-ion battery as a power source. An inverter 7 is connected to a stator coil of the motor/generator 3. The inverter 7 converts direct current electrical power from the lithium-ion battery into three-phase alternating current electrical power during powering of the motor/generator 3 and supplies same to the motor/generator 3. In addition, the inverter 7 converts a three-phase alternating current electrical power generated by the motor/generator 3 into direct current during regeneration of the motor/generator 3, and charges the lithium-ion battery.

The first clutch 4 is a normally-closed, dry-type, single-plate friction clutch that can continuously change the engagement capacity according to the supplied hydraulic oil pressure. The first clutch 4 is provided in the housing of the motor/generator 3. A forward clutch 5*a* and a reverse brake 5*b*, which are provided in a forward/reverse switching mechanism of the CVT 6 by planetary gears, are diverted for use as the second clutch 5. The forward clutch 5*a* and the reverse brake 5*b* are both normally-open, wet-type, single-plate friction clutches that can continuously change the engagement capacity according to the supplied hydraulic oil pressure. In the following description, the forward clutch 5*a* and the reverse brake 5*b* are collectively referred to as the second clutch 5, except when individual descriptions are provided therefor. The CVT 6 is a transmission that can achieve a stepless transmission ratio by changing the winding diameter of a belt 6*c* according to the hydraulic oil pressure that is supplied to the respective cylinder chamber of a primary pulley 6*a* and a secondary pulley 6*b*. The output shaft 6*d* of the CVT 6 is connected to left and right front wheels 10, which are the drive wheels, via a final reduction gear train 8, a differential gear (not shown) and left and right drive shafts 9.

The main mechanical oil pump (mechanical oil pump) 11 draws and pressurizes the oil stored in the oil pan 12 and discharges same to the oil passage 13*a*. The main mechanical oil pump 11 is rotationally driven by the motor output shaft 3*a*. The oil that is discharged into the oil passage 13*a* is passed through a flapper valve 14*a*, then regulated as hydraulic oil pressure by respective proportional solenoids 15a, 15b, 15, 15d, 15e, and then respectively supplied to the first clutch 4, the forward clutch 5a of the second clutch 5, the reverse brake 5b of the second clutch 5, the primary pulley 6a, and the secondary pulley 6b. The flapper valve 14a is a one-way valve that opens when at or above a predetermined pressure.

The sub-electric oil pump (electric oil pump) 16 sucks up and pressurizes the oil stored in the oil pan 12, and discharges the same to the oil passage 13b. The sub-electric oil pump 16 is rotationally driven by an electric motor 16a, which uses the lithium-ion battery as a power source. In view of cost and mountability, the sub-electric oil pump 16 uses an oil pump with a smaller discharge capacity than the main mechanical oil pump 11. The oil that is discharged into the oil passage 13b is supplied to one of the oil passage 13c and the oil passage 13d by a switching valve 17. The switching valve 17 connects the oil passage 13b and the oil passage 13c at the time of non-energization, and connects the oil passage 13b and the oil passage 13d at the time of energization. The oil that is supplied to the oil passage 13c is passed through a flapper valve 14b, then regulated as a hydraulic oil pressure by respective proportional solenoids 15a, 15b, 15, 15d, 15e, and then respectively supplied to the first clutch 4, the forward clutch 5a of the second clutch 5, the reverse brake 5b of the second clutch 5, the primary pulley 6a, and the secondary pulley 6b. The flapper valve 14b is a one-way valve that opens when at or above a predetermined pressure. The oil that is supplied to the oil passage 13d is supplied to the forward clutch 5a as a standby hydraulic pressure for the elimination of backlash, which eliminates slack from the stroke of the forward clutch 5a. The switching valve 17 is energized when the motor/generator 3 stops in a state in which the D range is selected. Backlash elimination of the second clutch 5 (forward clutch 5a) will be described further below.

The one-motor, two-clutch powertrain described above has three traveling modes, the "EV traveling mode," the "HEV traveling mode," and the "WSC traveling mode." In the EV traveling mode, traveling is carried out using only the motor/generator 3 as the drive source, with the first clutch 4 released and the second clutch 5 engaged. "Engagement" means a full engagement state in which a differential rotation between the input and output is not permitted. The motor/generator 3 carries out torque control based on a target motor torque, and the target motor torque is set according to a required drive torque, which is determined from the accelerator position opening amount, the vehicle speed, and the like. In the HEV traveling mode, traveling is carried out, in which the engine 1 is included as a drive source, with the first clutch 4 and the second clutch 5 engaged. The target engine torque shall be an engine torque that can achieve an operating point with a high output efficiency of the engine 1. The motor/generator 3 carries out torque control based on the target motor torque, and the target motor torque shall be the difference between the required drive torque and the target engine torque.

In the WSC traveling mode, traveling is carried out using only the motor/generator 3 as the drive source, with the first clutch 4 released and the second clutch 5 slipped. "Slip" means a slip-engaged state in which a differential rotation between the input and output is permitted. The target second clutch engagement capacity is set according to the required drive torque. The rotational speed of the motor/generator 3 is controlled based on the target motor rotation speed, and the target motor rotation speed shall be the idling rotational speed of the engine 1. The selection of the traveling mode is made on the basis of the accelerator position opening amount, the vehicle speed, and the battery SOC. When the accelerator position opening amount is equal to or less than a predetermined opening amount, the EV traveling mode is selected. When the accelerator position opening amount exceeds the predetermined opening amount, the WSC traveling mode is selected in a low vehicle speed region, and the HEV traveling mode is selected in a medium to high vehicle speed region. The WSC traveling mode is selected even when the accelerator position opening amount is equal to or less than the predetermined opening amount if the battery SOC is low.

The FF hybrid vehicle of the first embodiment has, as a configuration for controlling the powertrain, a hybrid control module (HCM) 20, an engine control module (ECM) 21, a motor controller (MC) 22, a CVT control unit (CVTCU) 23, a lithium-ion battery controller (LBC) 24, and a brake control unit (BCU) 25. These are connected via a CAN communication line. The HCM (control unit) 20 manages the energy consumption of the entire vehicle, and assumes the function of running the vehicle at maximum efficiency. The HCM 20 inputs the engine rotation speed detected by an engine rotational speed sensor 31, the motor rotation speed detected by a motor rotational speed sensor 32, the transmission input rotation speed detected by a transmission input rotational speed sensor 33, a primary pressure detected by a primary hydraulic pressure sensor 34, a secondary pressure detected by a secondary hydraulic pressure sensor 35, a forward clutch hydraulic pressure (second clutch hydraulic pressure) detected by a second clutch hydraulic pressure sensor 36, an oil temperature detected by an oil temperature sensor 37, an accelerator position opening amount detected by an accelerator position opening amount sensor 38, a brake pedal stroke detected by a brake pedal stroke sensor 39, a battery SOC, a battery temperature detected by a battery temperature sensor 40, and the vehicle speed calculated from the speed of each of wheel detected by a wheel speed sensor 41, directly or via CAN communication. The HCM 20 determines the operating point of the powertrain and selects the traveling mode based on each piece of input information, and generates each of the target values (target engine torque, target motor torque or target motor rotation speed, target first clutch engagement capacity, target second clutch engagement capacity, target transmission ratio, target rate of deceleration, and the like) in accordance with the traveling mode and the state of the lithium-ion battery.

The ECM 21 outputs a command for controlling the engine operating point to a throttle valve actuator of the engine 1 based on the target engine torque, and the like. The MC 22 outputs a command for controlling the motor operating point to the inverter 7, based on the target motor torque (or the target motor rotation speed). The CVTCU 23 outputs a command for controlling the engagement capacity of each of the first clutch 4 and the second clutch 5 to the respective proportional solenoids 15a, 15b, 15c, based on the target first clutch engagement capacity and the target second clutch engagement capacity. In addition, the CVTCU 23 outputs a command for controlling the belt winding diameters of the primary pulley 6a and the secondary pulley 6b to the respective proportional solenoids 15d, 15e, based on the target transmission ratio. The BCU 25 outputs a command for controlling the frictional braking torque that is generated by a disc brake provided to each wheel to the hydraulic pressure control unit (HU) 26, based on the target rate of deceleration. Additionally, when the target rate of deceleration cannot be achieved by only the regenerative braking torque during regeneration of the motor/generator 3, the BCU 25 outputs a command to compensate for the deficiency with the frictional braking torque to the HU 26 (regenerative cooperation control). The HU 26 supplies brake fluid to a hydraulic caliper of each disc brake, based on the command from the BCU 25.

When in an extremely low vehicle speed region and the accelerator position opening amount is zero when the EV traveling mode is selected, the HCM 20 executes a motor idle control that causes the motor/generator 3 to generate torque corresponding to the creep torque. In the motor idle control, the target motor rotation speed is set to a predetermined motor idle rotational speed (for example, 600 rpm), and sets the target second clutch engagement capacity to correspond to the creep torque (for example, 40 Nm). The torque of the creep torque device may be increased as the vehicle speed decreases. When the driver turns the brake ON during a motor idle control and the vehicle stopped state has continued for a predetermined time $T_1$, the HCM 20 determines that the driver intends to stop the vehicle, and switches from the motor idle control to a creep cut control for reducing the creep torque. In the creep cut control, the target second clutch engagement capacity is set to correspond to the creep cut torque (for example, 6 Nm). The target motor rotation speed shall be the same as at the time of the motor idle control. At the time of a vehicle stop request, it is possible to suppress the power consumption of the motor/generator 3 by transitioning from the creep control to the creep cut control. If the driver removes his or her foot from the brake pedal during the creep cut control, the control transitions to the motor idle control again. In addition, when the creep cut control has continued for a predetermined time $T_2$, the HCM 20 switches from the creep cut control to a motor stopping process for stopping the motor/generator 3 (corresponding to the idle stop control). In the motor stopping process, the target motor rotation speed is reduced to zero gradually or in a stepwise manner, and the target second clutch engagement capacity is set to zero to release the second clutch 5. The motor stopping process is carried out during a specified time. If the vehicle stops during the EV traveling mode, it is possible to improve the fuel efficiency of the motor/generator 3 by stopping the motor/generator 3.

If the second clutch 5 is released during a vehicle stop as described above, the engagement response delay of the second clutch 5 will be long at the time of the next start. The second clutch 5 generates an engagement capacity by the clutch plate being pressed by the piston. A return spring is provided relative to the piston from the standpoint of reducing drag torque, and if the supplied hydraulic pressure to the second clutch 5 is excessively reduced, the piston is returned by the return spring. As a result, if the piston and the clutch plate are separated from each other, even if the supply of hydraulic pressure is restarted, an engagement capacity is not generated in the second clutch 5 until the piston strokes and comes into contact with the clutch plate (until the slack in the stroke is eliminated); therefore, the time lag to start is increased. Therefore, when the creep cut control described above is started, the HCM 20 energizes the switching valve 17 and rotationally drives the electric motor 16a at a specified rotational speed, in preparation for the next start. A standby hydraulic pressure for eliminating backlash is supplied from the sub-electric oil pump 16 to the second clutch 5. It is thereby possible to suppress the engagement response delay of the second clutch 5. Until the vehicle starts to move at the time of the next start, the HCM 20 continues the backlash elimination of the second clutch 5.

The FF hybrid vehicle of the first embodiment ensures the hydraulic oil pressure of the CVT 6 by the hydraulic pressure that is generated by the main mechanical oil pump 11, which is driven by the motor/generator 3. Therefore, when the motor/generator 3 is stopped when the vehicle is stopped as described above, hydraulic pressure is no longer supplied to the respective cylinder chambers of the primary pulley 6a and the secondary pulley 6b, and the hydraulic pressure of the cylinder chambers is reduced. If the hydraulic oil pressure of the CVT 6 is reduced, a delay occurs from the time when the main mechanical oil pump 11 is started at the time of the next start until the hydraulic oil pressure required by the CVT 6 is secured; therefore, the acceleration response grows worse. Therefore, if a motor stoppage cancellation request, which is a request to cancel the stoppage of the motor/generator 3, is made when the vehicle is stopped after a motor stopping process, the HCM 20 carries out a motor rotational speed control for increasing the motor rotation speed to the target rotational speed. The HCM 20 determines a motor stoppage cancellation request based on the driver's starting intention (for example, brake OFF, the braking force is equal to or less than a predetermined braking force, the accelerator position opening amount is equal to or greater than a predetermined opening amount, and the like), the system state (for example, when other than the EV start mode is selected), the vehicle state (for example, the vehicle is moving, the road surface gradient is equal to or greater than a predetermined gradient, not in the D range, creep cut not permitted), and the like. The target rotational speed shall be a motor rotation speed (for example, 1,000 rpm) at which it is possible to obtain a discharge flow rate of the main mechanical oil pump 11, with which it is possible to sufficiently secure the hydraulic oil pressure required by the CVT 6 at the time of start. If a motor stoppage cancellation request is made, it is possible to suppress a deterioration in the acceleration response at the time of the next start, by rotating the main mechanical oil pump 11 at a high speed to rapidly charge the hydraulic oil pressure of the CVT 6.

After the motor stopping process described above, the differential rotation between the input and output of the second clutch 5 is zero. Here, backlash elimination is carried out so that the engagement capacity of the second clutch 5 becomes zero, but if there is large non-negative variation in the engagement capacity caused by individual differences, long-term changes, oil temperature, and the like, the second clutch 5 will have an engagement capacity. At this time, if a command current for eliminating the deviation between the target motor rotation speed and the actual motor rotation speed is output to the motor/generator 3 by the motor rotational speed control, torque is transmitted from the second clutch 5 to the drive shaft 9, and vehicle shock is generated. Therefore, in the first embodiment, in order to both secure the acceleration response and reduce shock, torque limitation is carried out in the motor rotational speed control during a motor stoppage cancellation request.

Figure 2:
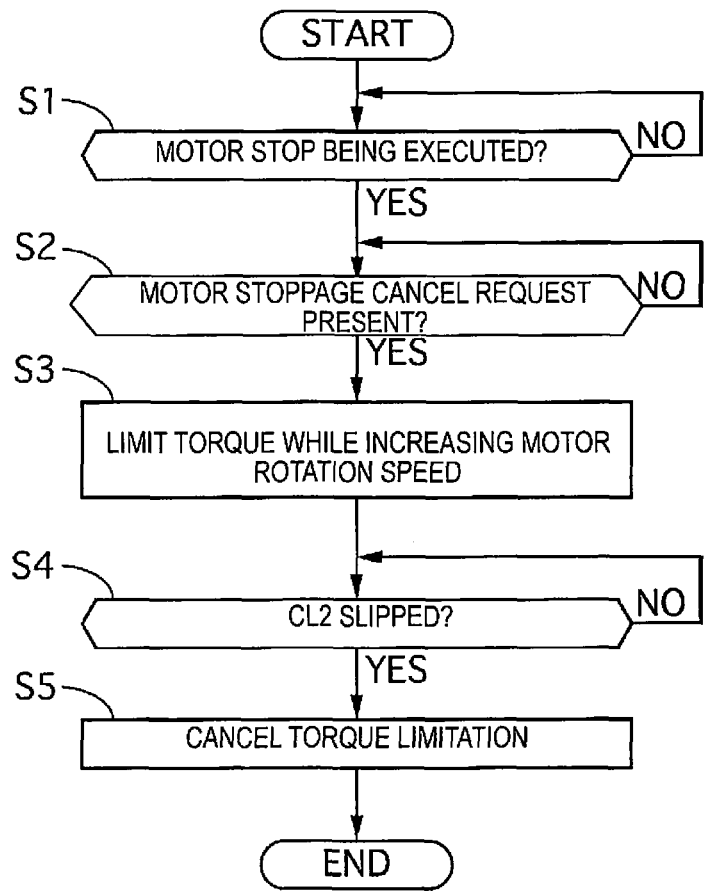
FIG. 2 is a flowchart illustrating the flow of a motor rotational speed control at the time of a motor stoppage cancellation request by an HCM 20 of the first embodiment.

FIG. 2 is a flowchart illustrating the flow of a motor rotational speed control at the time of a motor stoppage cancellation request by an HCM 20 of the first embodiment. In Step S1, it is determined whether or not motor stopping is being carried out by the motor stopping process. In the case of YES, the process proceeds to Step S2, and if NO, Step S1 is repeated. In Step S2, it is determined whether or not there is a motor stoppage cancellation request. In the case of YES, the process proceeds to Step S3, and if NO, Step S2 is repeated. In Step S3, a motor rotational speed control is started, in which the motor torque is limited and the motor rotation speed is matched to the target rotational speed (1,000 rpm). Normally, a motor torque command value, to the degree that can maintain the rotational speed while overcoming the friction at the time of a rotational speed of 1000 rpm, is sent to the motor, as the torque command value for the motor. In the present embodiment, the motor torque is limited such that shock at the time of the increase in the motor rotation is not transmitted to the vehicle, when the second clutch 5 is engaged to the extent that the drive torque is transmitted. Specifically, a torque command calculation value that eliminates the deviation between the target motor rotation speed and the actual motor rotation speed is calculated, the calculated torque command calculation value and the previous torque command value+ predetermined value are compared, and the smaller value is selected as the torque command value. A command current corresponding to the selected torque command value is applied to the motor/generator 3. That is, the torque limitation limits the upper limit of the change rate of the motor torque to a rate limit value. The rate limit value shall be a change rate of the motor torque that will generate slip of the second clutch 5 within a predetermined time $T_3$, which does not impart a sluggish sensation to the driver during the acceleration. The relationship between the predetermined time $T_3$, the motor torque, and the motor rotation speed is obtained in advance by experimentation, simulation, or the like. In addition, the rate limit value shall be a change rate in the motor torque with which the acceleration of the vehicle does not exceed an allowable G threshold value, when the motor torque is transmitted to the drive shaft 9. An acceleration exceeding the allowable G threshold value imparts discomfort to the driver. In Step S4, it is determined whether or not the second clutch 5 (CL2) has slipped. In the case of YES, the process proceeds to Step S5, and if NO, Step S4 is repeated. In this step, it is determined that the second clutch 5 is in a slip state when the motor rotation speed is equal to or greater than a predetermined rotational speed, and when the differential rotation between the input and output of the second clutch 5 (differential rotation between the motor rotation speed and the transmission input rotational speed) is equal to or greater than a predetermined differential rotation. In Step S5, then limitation of the torque is canceled, and the motor rotation speed is immediately increased to the target rotational speed.

Figure 3:
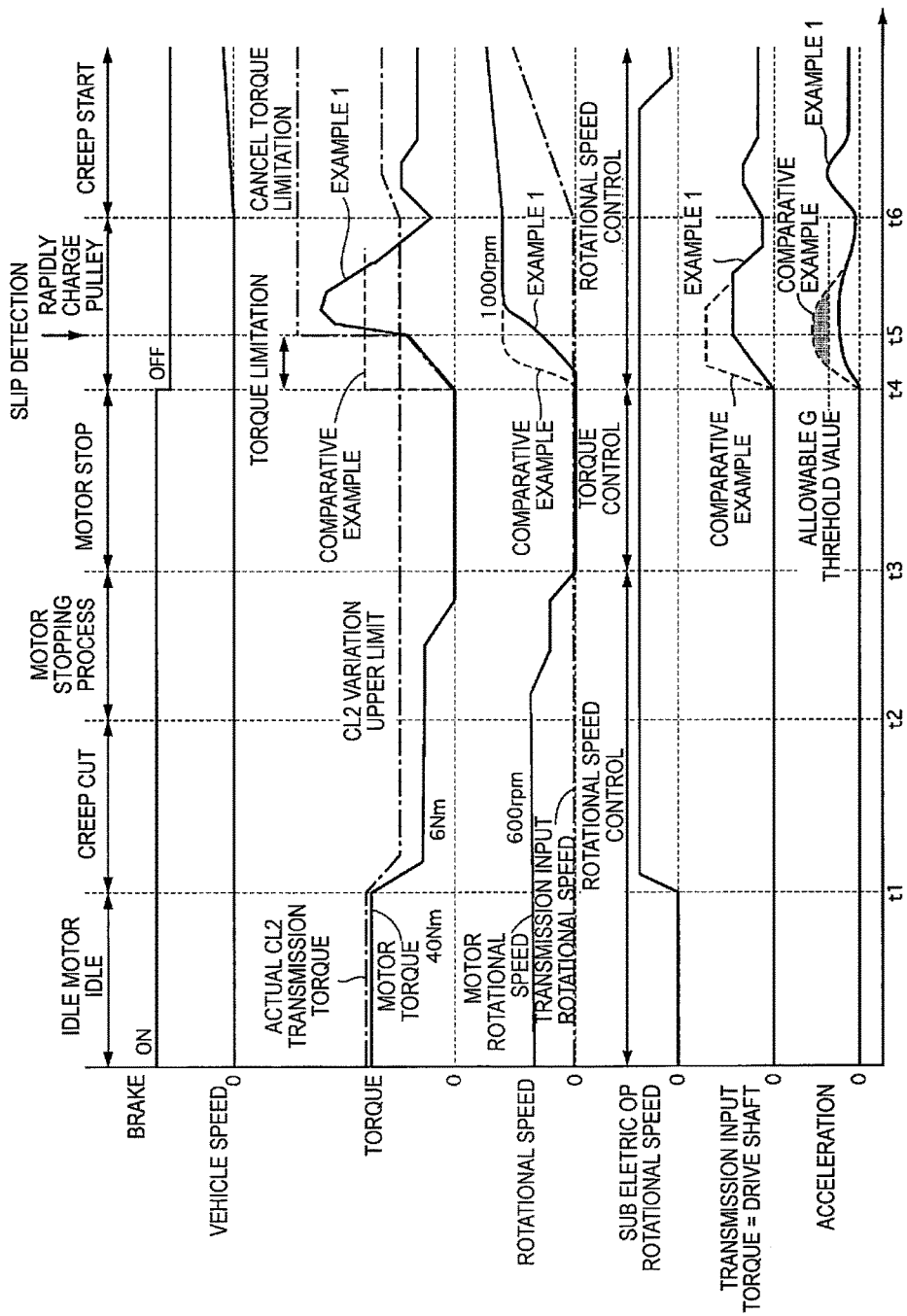
FIG. 3 is a time chart illustrating the torque limiting action of the first embodiment.

FIG. 3 is a time chart illustrating the torque limiting action of the first embodiment. It is assumed that the EV traveling mode is selected, the vehicle is in a stopped state by a braking operation of the driver, and a motor idle control is being carried out. At time t1, since a predetermined time $T_1$ has elapsed since entering a vehicle stopped state during a motor idle control, the control transitions from the motor idle control to a creep cut control. The engagement capacity of the second clutch 5 is reduced from 40 Nm to 6 Nm due to the creep cut control. In addition, since the creep cut control has started, the sub-electric oil pump 16 is driven to carry out backlash elimination of the second clutch 5. At time t2, since a predetermined time $T_2$ has elapsed since the start of the creep cut control, the control transitions from the creep cut control to a motor stopping process. At time t3, since a specified time has elapsed since the start of the motor stopping process, the motor/generator 3 is stopped (power supply to the motor/generator 3 is stopped). Therefore, the motor torque and the motor rotation speed both become zero.

At time t4, since a motor stoppage cancellation request is made by the driver's brake OFF, torque limitation is carried out while a motor rotational speed control to increase the motor rotation speed is started. Here, as a comparative example of the first embodiment, a case in which torque limitation is not carried out and the motor rotation speed is increased to the target rotational speed (1,000 rpm) is considered. In the comparative example, in a case in which the variation in the engagement capacity of the second clutch 5 after backlash elimination is at the upper limit on the positive side and the second clutch has an engagement capacity, the acceleration exceeds the allowable G threshold value by the motor torque being suddenly raised. In contrast, in the first embodiment, since the motor rotation speed is raised while limiting the change rate of the motor torque by the rate limit, even if the second clutch 5 has an engagement capacity, the acceleration is suppressed below the allowable G threshold value; therefore, it is possible both to ensure the acceleration response and to reduce shock. At time t5, since a slip state of the second clutch 5 is detected, then the limitation of the torque is canceled and the motor rotation speed is raised to 1,000 rpm. When the second clutch 5 is brought into the slip state, since shock can be absorbed by the differential rotation between the input and output of the second clutch 5, the acceleration will not exceed the allowable G threshold value even if then the limitation of the torque is canceled. Here, if the torque limitation is continued even after the second clutch 5 is brought into the slip state, the hydraulic pressure charging of the CVT 6 is delayed, and the acceleration response has deteriorated. Therefore, if the second clutch 5 is brought into the slip state and then it becomes possible to control the transmission torque by the engagement capacity, it is possible to further improve the acceleration response by canceling the torque limitation. At time t6, the vehicle undergoes a creep start by the motor torque.

The following effects are exerted in the first embodiment.

(1) A method of controlling a vehicle comprising a second clutch 5 that is capable of switching between engagement and disengagement between a motor/generator 3 and a front wheel 10, a main mechanical oil pump 11 that is driven by the motor/generator 3 and supplies hydraulic oil pressure to the second clutch 5, and a sub-electric oil pump 16 that is driven by an electric motor 16a and supplies hydraulic oil pressure to the second clutch 5, wherein, the motor/generator 3 is stopped when the vehicle is stopped, the second clutch 5 is kept released by the hydraulic pressure from the sub-electric oil pump 16 in a state in which slack in the stroke is eliminated, the rotational speed of the motor/ generator 3 is increased toward a target rotational speed upon receiving a motor stoppage cancellation request, and when increasing the rotational speed of the motor/generator 3 toward the target rotational speed, a torque of the motor/ generator is limited to is less than the torque of the motor/ generator 3 at which it is possible to maintain the target rotational speed. Therefore, it is possible to improve the fuel efficiency of the motor/generator 3 by stopping the motor/ generator 3 when the vehicle is stopped. In addition, with respect to the main mechanical oil pump 11 not generating a hydraulic pressure due to stopping the motor/generator 3, since backlash elimination of the second clutch 5 is carried out by the sub-electric oil pump 16, it is possible to suppress an engagement response delay of the second clutch 5 at the time of the next start. Furthermore, it is possible to improve the acceleration response at the time of the next start, by increasing the motor rotation speed to the target rotational speed, at the time of a motor stoppage cancellation request. At this time, shock in the vehicle can be reduced by limiting the motor torque.

(2) If slipping of the second clutch 5 is detected, then limitation of the torque is canceled. Therefore, when in a state in which shock can be absorbed by the differential rotation of the second clutch 5, it is possible to further improve the acceleration response by immediately increasing the motor rotation speed to the target rotational speed.

(3) The torque limitation is for limiting a change rate of the torque such that a slip occurs in the second clutch 5 within a predetermined time $T_3$ after a motor stoppage cancellation request is made. Therefore, it is possible to prevent a sluggish sensation from being imparted to the driver during acceleration.

(4) The invention is provided with a second clutch 5 that is capable of switching between engagement and disengagement between a motor/generator 3 and front wheels 10, a main mechanical oil pump 11 that is driven by the motor/generator 3 and supplies hydraulic oil pressure to the second clutch 5, a sub-electric oil pump 16 that is driven by an electric motor 16a and supplies hydraulic oil pressure to the second clutch 5, and an HCM 20 that stops the motor/generator 3 when the vehicle is stopped, keeps the second clutch 5 released by the hydraulic pressure from the sub-electric oil pump 16 in a state in which slack in the stroke is eliminated, increases the rotational speed of the motor/generator 3 toward a target rotational speed when there is a motor stoppage cancellation request, and, when increasing the rotational speed of the motor/generator 3 toward the target rotational speed, limits the torque to a torque that is lower than the torque of the motor/generator 3 at which it is possible to maintain the target rotational speed. Therefore, it is possible to improve the fuel efficiency of the motor/generator 3 by stopping the motor/generator 3 when the vehicle is stopped. In addition, with respect to the main mechanical oil pump 11 not generating a hydraulic pressure due to stopping the motor/generator 3, since backlash elimination of the second clutch 5 is carried out by the sub-electric oil pump 16, it is possible to suppress an engagement response delay of the second clutch 5 at the time of the next start. Furthermore, it is possible to improve the acceleration response at the time of the next start, by increasing the motor rotation speed to the target rotational speed, at the time of a motor stoppage cancellation request. At this time, shock in the vehicle can be reduced by limiting the motor torque.

Second Embodiment

Figure 4:
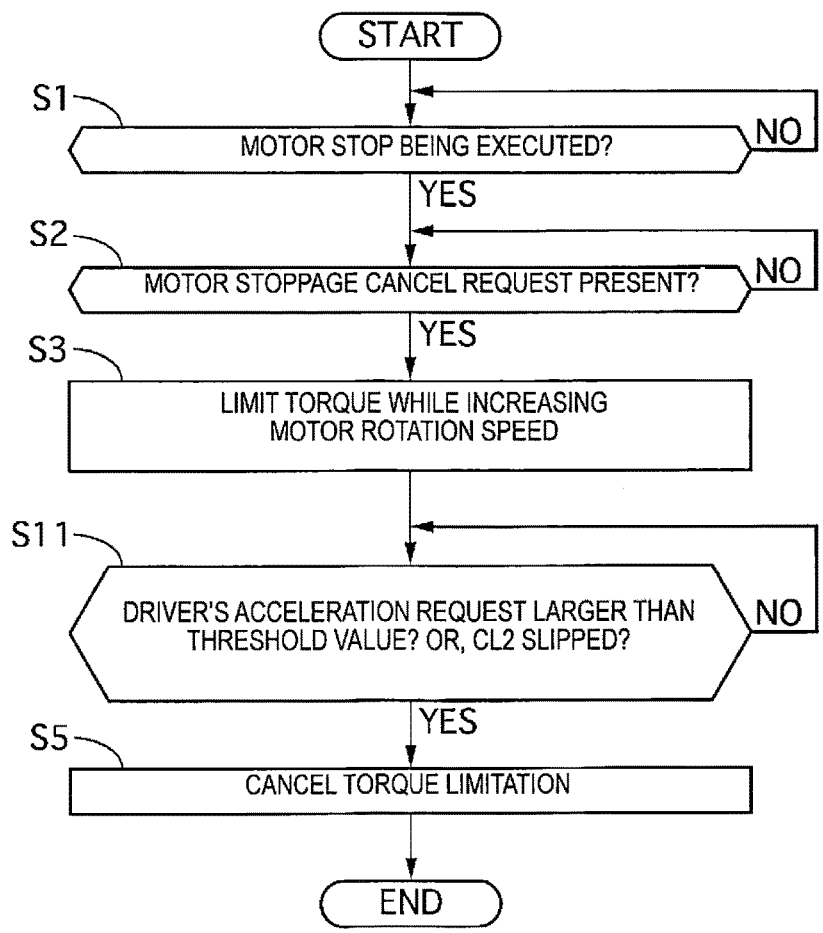
FIG. 4 is a flowchart illustrating the flow of a motor rotational speed control at the time of a motor stoppage cancellation request by an HCM 20 of the second embodiment.

The second embodiment will now be described. Since the basic configuration is the same as the first embodiment, only the points of difference will be described. \FIG. 4 is a flowchart illustrating the flow of a motor rotational speed control at the time of a motor stoppage cancellation request by an HCM 20 of the second embodiment. Only the steps that differ from the first embodiment illustrated in FIG. 2 will be described.

In Step S11, it is determined whether or not a value indicating the driver's acceleration request is greater than a threshold value is present, or whether or not the second clutch 5 has slipped. If either one is YES, the process proceeds to Step S5, and if both are NO, Step S11 is repeated. The comparison between the acceleration request and the threshold value is carried out by comparing a required drive torque, which is determined by the accelerator position opening amount, and a predetermined drive torque threshold.

In the second embodiment, if the value indicating the acceleration request of the driver exceeds the threshold value when the motor torque is being increased by the torque limitation, then limitation of the torque is canceled even if the second clutch 5 is not slipping. If the driver requests a very fast start response, it is necessary to ensure the hydraulic oil pressure of the CVT 6 at an earlier stage. In addition, if the request is for a very fast start response request, no discomfort is imparted to the driver, even if some shock occurs. Therefore, in this case, it is possible to satisfy the request of the driver by prioritizing the securing of the acceleration response compared to a reduction in shock.

The following effect is exerted in the second embodiment.

(5) If a value indicating an acceleration request of the driver exceeds a threshold value, then the limitation of the torque is canceled. Therefore, the driver's start response request can be satisfied.

Other Embodiments

A preferred embodiment of the present invention was described above based on embodiments, but specific configurations of the present invention are not limited by the embodiments, and changes to the design made without departing from the scope of the invention are also included in the present invention. For example, the present invention can be applied to an electrically driven vehicle that has only a motor/generator as the drive source.

The invention claimed is:

1. A vehicle control method of controlling a vehicle, the vehicle control method comprising:
   a friction clutch that is configured to switch between engagement and disengagement between a motor/generator and a drive wheel;
   a mechanical oil pump that is driven by the motor/generator and supplies hydraulic oil pressure to the friction clutch; and
   an electric oil pump that is driven by an electric motor and supplies hydraulic oil pressure to the friction clutch,
   the motor/generator being stopped when the vehicle is stopped,
   the friction clutch being kept released by the hydraulic pressure from the electric oil pump in a state in which slack in a stroke is eliminated,
   a rotational speed of the motor/generator being increased toward a target rotational speed upon receiving a motor stoppage cancellation request of the motor/generator, and
   when increasing the rotational speed of the motor/generator toward the target rotational speed, a torque of the motor/generator is limited to less than the torque of the motor/generator at which it is possible to maintain the target rotational speed, and if a slip of the friction clutch is detected, then limitation of the torque is canceled.

2. The vehicle control method as recited in claim 1, wherein
   the limitation of the torque is for limiting a change rate of the torque such that a slip occurs in the friction clutch within a predetermined time after the motor stoppage cancellation request is made.

3. The vehicle control method as recited in claim 1, wherein
   if a value indicating an acceleration request of a driver exceeds a threshold value, then the limitation of the torque is canceled.

4. A vehicle control device comprising:
   a friction clutch that is configured to switch between engagement and disengagement between a motor/generator and a drive wheel, a mechanical oil pump that is driven by the motor/generator and supplies hydraulic oil pressure to the friction clutch;

an electric oil pump that is driven by an electric motor and supplies hydraulic oil pressure to the friction clutch; and a control unit that stops the motor/generator when the vehicle is stopped, keeps the friction clutch released by the hydraulic pressure from the electric oil pump in a state in which slack in a stroke is eliminated, increases a rotational speed of the motor/generator toward a target rotational speed upon receiving a stoppage cancellation request of the motor/generator, and limits a torque of the motor/generator to less than the torque of the motor/generator at which it is possible to maintain the target rotational speed when increasing the rotational speed of the motor/generator toward the target rotational speed, and if a slip of the friction clutch is detected, then cancels limitation of the torque.

5. The vehicle control method as recited in claim 2, wherein if a value indicating an acceleration request of a driver exceeds a threshold value, then the limitation of the torque is canceled.

* * * * *